(12) United States Patent
Takarada

(10) Patent No.: US 7,561,751 B2
(45) Date of Patent: Jul. 14, 2009

(54) IMAGE PROCESSING METHOD

(75) Inventor: Shinichi Takarada, Niihama (JP)

(73) Assignee: Panasonic Corporation, Osaka (JP)

( * ) Notice: Subject to any disclaimer, the term of this patent is extended or adjusted under 35 U.S.C. 154(b) by 574 days.

(21) Appl. No.: 11/258,318

(22) Filed: Oct. 26, 2005

(65) Prior Publication Data

US 2006/0093235 A1    May 4, 2006

(30) Foreign Application Priority Data

Nov. 2, 2004   (JP)   ............................. 2004-318631

(51) Int. Cl.
  *G06K 9/40*  (2006.01)
  *G06K 9/32*  (2006.01)
  *H04N 1/46*  (2006.01)

(52) U.S. Cl. .................. 382/264; 382/300; 359/525

(58) Field of Classification Search ................ 382/264, 382/266–269, 274–275, 298–300; 358/1.2, 358/3.15, 3.26, 3.27, 520, 525, 528; 345/667
See application file for complete search history.

(56) References Cited

U.S. PATENT DOCUMENTS

| | | | | |
|---|---|---|---|---|
| 5,825,846 A * | 10/1998 | Aach et al. | ...................... | 378/98 |
| 5,917,963 A * | 6/1999 | Miyake | ....................... | 382/300 |
| 6,307,569 B1 * | 10/2001 | Ratakonda | ................... | 345/671 |
| 6,704,440 B1 * | 3/2004 | Kump | ........................ | 382/132 |
| 6,833,845 B2 * | 12/2004 | Kitagawa et al. | ............ | 345/667 |
| 7,327,898 B2 * | 2/2008 | Fan | ............................ | 382/275 |

FOREIGN PATENT DOCUMENTS

| | | |
|---|---|---|
| JP | 02-056179 | 2/1990 |
| JP | 02-217088 | 8/1990 |
| JP | 05-304621 | 11/1993 |
| JP | 08-180177 | 7/1996 |
| JP | 08-336137 | 12/1996 |
| JP | 10-322603 | 12/1998 |
| JP | 11-052904 | 2/1999 |
| JP | 11-257937 | 9/1999 |
| JP | 11-289457 | 10/1999 |
| JP | 2001-036812 | 2/2001 |
| JP | 2001061157 A | 3/2001 |
| JP | 2002-150281 | 5/2002 |
| JP | 2002-259965 | 9/2002 |
| JP | 2003-028809 | 1/2003 |
| JP | 2004-023331 | 1/2004 |

* cited by examiner

*Primary Examiner*—Kanji Patel
(74) *Attorney, Agent, or Firm*—Steptoe & Johnson LLP

(57) ABSTRACT

Low-pass filtering is applied only to the borders of an original mage to reduce the noise in the borders of image, thereby preventing errors in extrapolation. Then, an extended region is provided around the image by extrapolation, thereby eliminating the need for border processing in the borders of the image when performing the final low-pass filtering. Finally, low-pass filtering is applied to the regions where the original image exists. Thus, a filtering effect can be obtained in which the regions nearer to the center of the image and the border regions of the image have the same characteristics.

7 Claims, 9 Drawing Sheets

F I G. 5
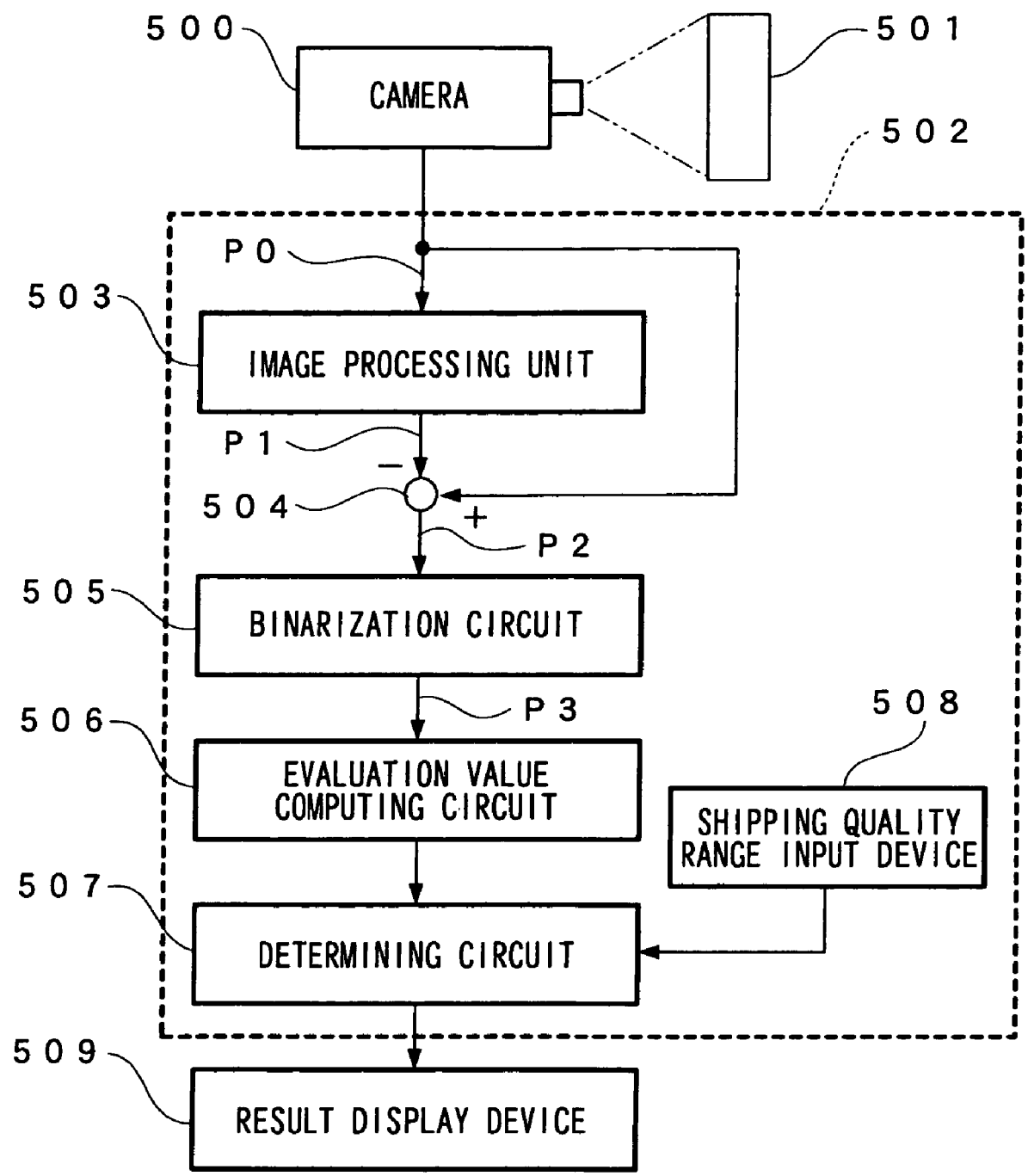

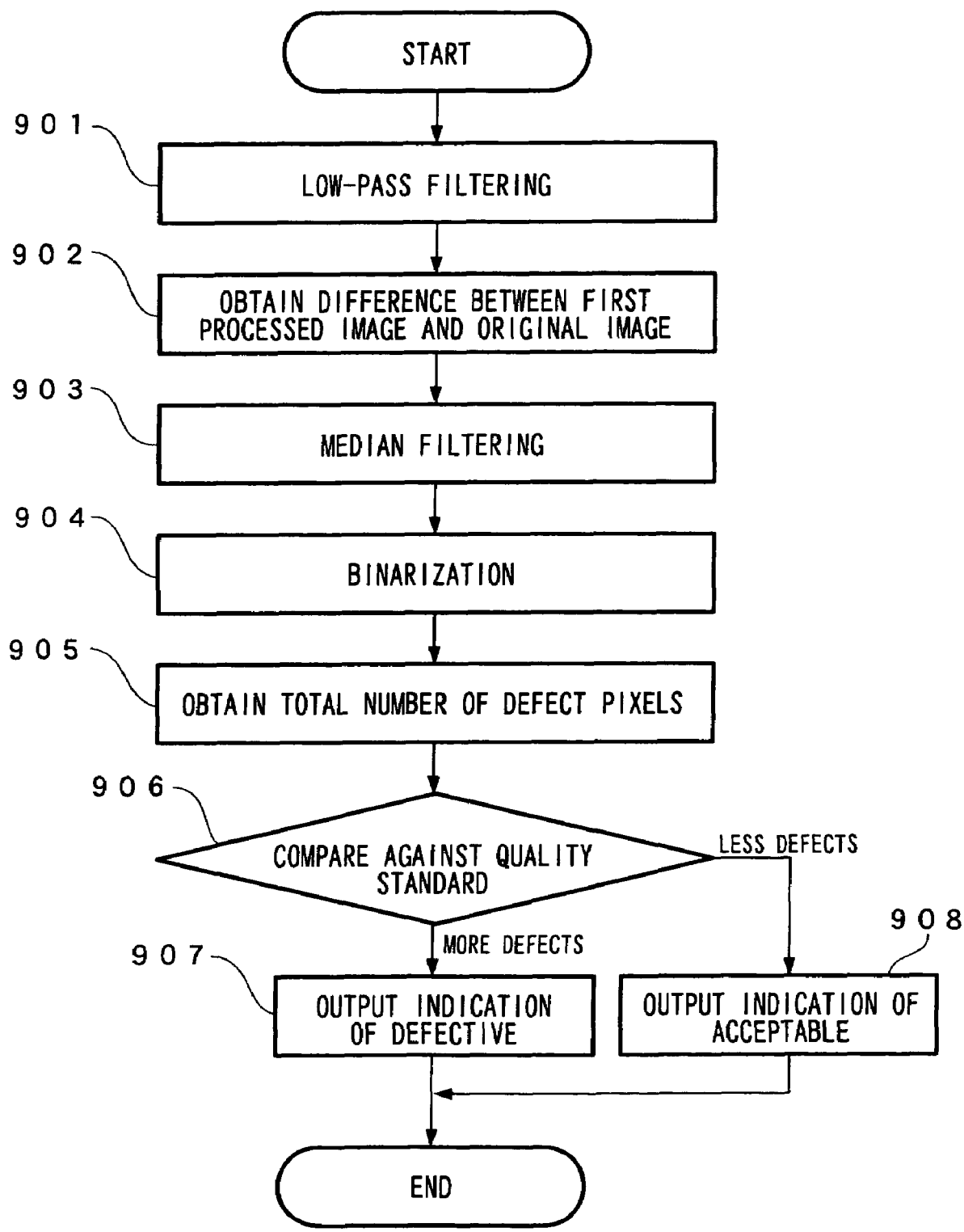

IMAGE PROCESSING METHOD

FIELD OF THE INVENTION

The present invention relates to an image processing method which applies low-pass filtering to a captured image.

BACKGROUND OF THE INVENTION

Image processing methods which apply low-pass filtering to images typically obtain the average of pixels in a neighborhood of a pixel under consideration and use the average as a new brightness value of the pixel under consideration. Here, widening the area over which averaging is performed can enhance low-pass filtering and therefore remove local features in the image and provide a macro brightness distribution.

Conventional image processing methods are used primarily for the purpose of removing noise. Accordingly, they are designed to preserve edge components of pixels to be processed as much as possible. For example, one method used is to select only pixels located in the direction in which a stronger correlation exists when neighborhood pixel averaging is performed (see for example Japanese Patent Laid-Open No. 2001-61157).

However, none of the conventional image processing techniques provides arrangements for processing in the borders of images. For example, if low-pass filtering is performed by averaging 3 pixels located in all vertical and horizontal directions from a pixel of interest, averaging of a 7×7 pixels centered at that pixel is required. If a pixel of interest is in the right border of an image, however, there are no pixels to the right of that pixel. Therefore, in some typical methods, the original brightness values in the 3-pixel-wide borders of an image are used without change; in other typical methods, new brightness values are computed from the average values only in the areas in which pixels exist.

Using the original brightness values without change has a problem that the borders are not low-pass-filtered, of course. On the other hand, computing a new brightness value from the average only of the areas where pixels exist has problems that the strength of a low-pass filter varies from location to location and that wrong brightness levels are assigned. The reason why wrong brightness levels are assigned is that if, for example, the brightness of an image increases from left to right, a new brightness value for a pixel of interest that is located in the right border is computed from the average of the brightness values of the pixel of interest and of pixels located on the left of the pixel of interest (the average of only the pixels having brightness values less than that of the pixel of interest) and consequently the pixel will have a brightness value lower than the proper brightness value at that position.

The present invention solves these problems with the conventional techniques and an object of the present invention is to provide an image processing method and an image processing apparatus capable of applying optimum low-pass filtering that ensures an average brightness even for pixels in borders.

DISCLOSURE OF THE INVENTION

According to the first aspect of the present invention, there is provided an image processing method of treating an image as two-dimensional data of pixels having multiple gray levels, the method including a step of applying low-pass filtering to at least the pixels in the borders of an original image or pixels near the borders, a step of extending the region of the original image and obtaining the brightness of the extended portion by extrapolation using as an origin a pixel included in the region to which the low-pass filtering has been applied, and a step of applying low-pass filtering to the region of the original image by using the brightness of the extended portion.

According to the second aspect of the present invention, in the image processing method of the first aspect, the step of applying low-pass filtering to at least the pixels in the borders of an original image or pixels near the borders includes applying one-dimensional low-pass filtering to the pixels in the borders of the original image.

According to the third aspect of the present invention, in the image processing method of the first aspect, the step of applying low-pass filtering to at least the pixels in the borders of an original image or pixels near the borders includes applying low-pass filtering by using pixels located in the direction perpendicular to the direction of extrapolation.

According to the fourth aspect of the present invention, in the image processing method of the first aspect, the extent to which the region of the original image is extended is determined depending on the extent of low-pass filtering to be applied to the region of the original image by using the brightness of the extended portion.

According to the fifth aspect of the present invention, in the image processing method of the fourth aspect, if the size of a neighborhood pixel region required for computation in low-pass filtering applied to the region of the original image including the extended portion is A pixels high×B pixels wide, the region of the original image is extended by A pixels in the vertical direction and by B pixels in the horizontal direction.

According to the sixth aspect of the present invention, the image processing method of the first aspect further includes a step of obtaining the differences between a first processed image obtained by performing the image processing method according to claim 1 and an original image to obtain a second processed image.

According to the seventh aspect of the present invention, in the image processing method of the sixth aspect, the second processed image is binarized to detect a defective portion contained in the original image.

According to the eighth aspect of the present invention, there is provided an image processing apparatus including an image processing unit which averages an original image which is an image of a flat panel used in inspection and captured by a camera to be inspected and detects a first processed image which is very close to the brightness distribution of the original image, a subtracter which detects a second processed image of the differences between the first processed image and the original image, a binarizing circuit which detects a resultant image resulting from binarizing of the second processed image, and a determining circuit which compares the resultant image against an allowable-quality standard to determine whether the quality of the camera to be inspected is acceptable or not.

According to the ninth aspect of the present invention, there is provided an image processing method including a step of applying low-pass filtering to at least the pixels in the borders or pixels near the borders of an original image which is an image of a flat panel used in inspection and captured by a camera to be inspected and detecting a first processed image which is very close to the brightness distribution of the original image, a step of detecting a second processed image of a difference between each pixel in the first processed image and its corresponding pixel in the original image, a step of applying median filtering to the second processed image and detecting a binarized resultant image, and a step of comparing the total count of defect pixels contained in the resultant image with the number of defect pixels specified in a quality standard and determining whether the camera is defective or not.

According to the tenth aspect of the present invention, there is provided an image processing method of treating an image as two-dimensional data of pixels having multiple gray levels, the method including a step of applying low-pass filtering to at least the pixels in the borders of an original image or pixels near the borders, a step of obtaining a first processed image by extending the region of the original image and obtaining the brightness of the extended portion by extrapolation using as an origin a pixel included in the region to which the low-pass filtering has been applied, a step of obtaining a second processed image by applying low-pass filtering to the first processed image, and a step of generating an image by comparing each pixel in the second processed image with its corresponding pixel in the original image and performing low-pass filtering using only the pixels of the first processed image at locations where differences obtained by the comparison between the pixels are smaller than a predetermined threshold.

According to the eleventh aspect of the present invention, the image processing method of the tenth aspect further includes a step of correcting an image to be corrected which is different from the original image by using a calibration image which is the image outputted from the step of generating an image by performing low-pass filtering using only the pixels of the first processed image at locations in the original image where differences obtained by the comparison between the pixels are smaller than a predetermined threshold.

According to the twelfth aspect of the present invention, in the image processing method of the eleventh aspect, division is performed between an image other then the original image and the calibration image on a pixel-by-pixel basis to correct an image different from the original image.

According to the thirteenth aspect of the present invention, there is provided an image processing method including a step of applying low-pass filtering to at least the pixels in the borders of an original image or pixels near the borders, a step of obtaining a first processed image by extending the region of the original image and obtaining the brightness of the extended portion by extrapolation using as an origin a pixel included in the region to which the low-pass filtering has been applied, a step of applying low-pass filtering to the first processed image to obtain a second processed image, and a step of comparing each pixel in the second processed image with its corresponding pixel in the original image and applying further low-pass filtering to the first processed image without using pixels having differences greater than or equal to a predetermined threshold.

According to the fourteenth aspect of the present invention, in the image processing method of the thirteenth aspect, the step of comparing each pixel in the second processed image with its corresponding pixel in the original image and applying further low-pass filtering to the first processed image without using pixels having differences greater than or equal to a predetermined threshold, includes a step of comparing each pixel in the second processed image with its corresponding pixel in the original image and if the difference in brightness is greater than a predetermined value, marking the relevant pixel, and a step of setting the marked pixel as a pixel of interest, checking the values of pixels in a neighborhood of the pixel of interest that are used in low-pass filtering, and using the values for averaging to set the average as a new brightness value of the pixel of interest.

According to the image processing method of the present invention, an optimum low-pass filtering result can be provided in which the average brightness of pixels even near the borders of an image is guaranteed.

Furthermore, the image processing apparatus using the image processing method of the present invention can implement an apparatus for inspecting cameras that is capable of detecting defects even in the borders of an image without fail and also can implement a fluorescent microscope capable of providing an image free of inconsistencies in brightness.

BRIEF DESCRIPTION OF THE DRAWINGS

FIG. 5 is a block diagram of an image processing apparatus according to a second embodiment of the present invention;

FIG. 9 is a flow chart of software implementation of a defect detecting apparatus 502 according to the second embodiment of the present invention.

DESCRIPTION OF THE EMBODIMENTS

An image processing method according to the present invention will be described below with respect to specific embodiments thereof.

First Embodiment

FIGS. 1 to 4A and 4B show a first embodiment of the present invention.

Figure 1:
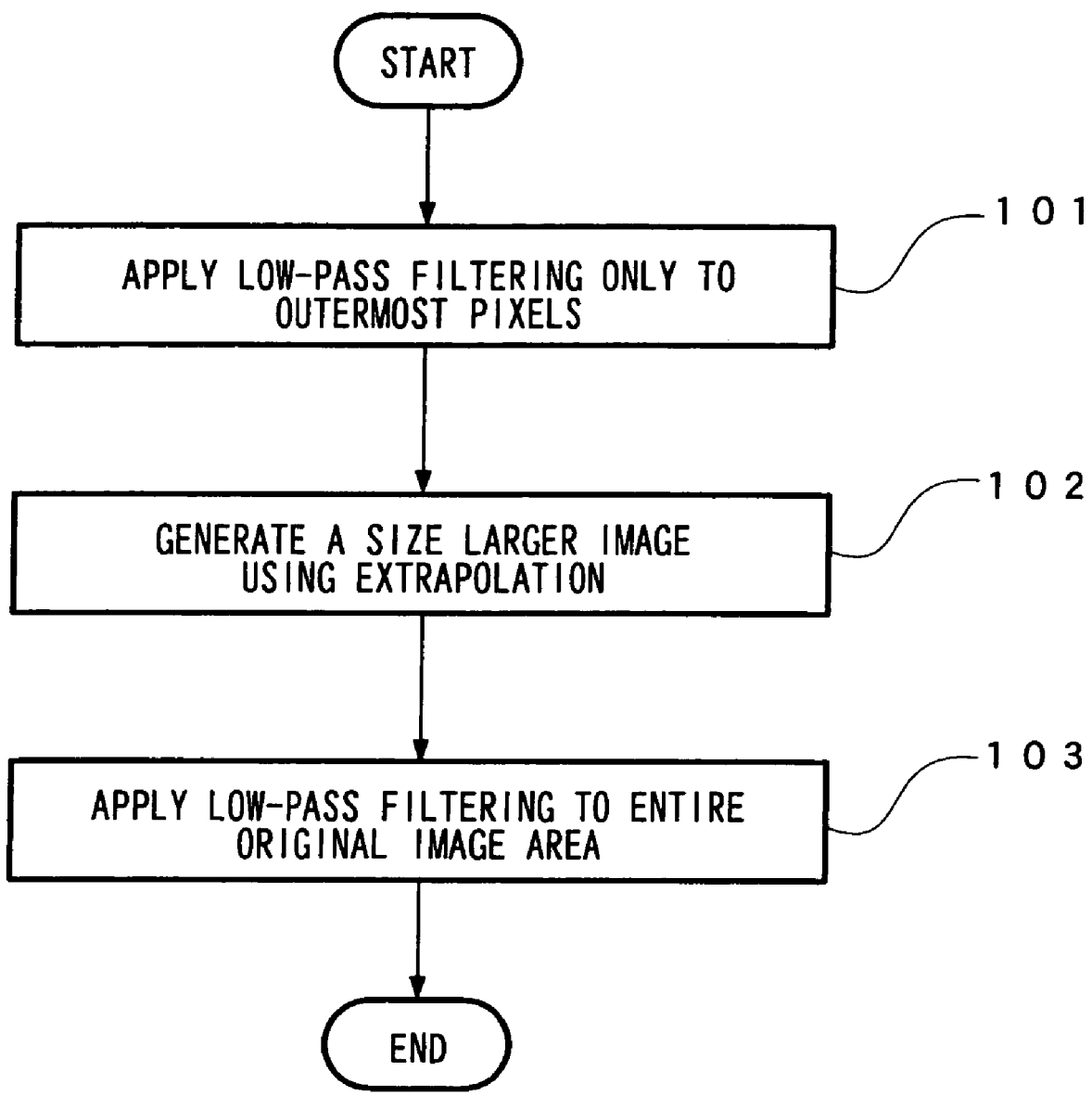
FIG. 1 is a flowchart of a process in an image processing method according to a first embodiment of the present invention.

FIG. 1 shows a process flow of an image processing method according to the first embodiment.

At step 101, low-pass filtering is applied only to the pixels located in the borders of an original image P0 of interest.

At step 102, extrapolation is performed to generate an image of a size larger than the original image.

At step 103, low-pass filtering is applied to the entire original image to generate a desired low-pass-filtered image.

The above-stated procedure will be descried with respect to a more specific example.

Figure 2:
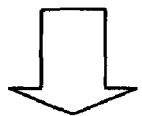
FIG. 2 is a diagram showing an arrangement of pixels in an original image in the first embodiment.

FIG. 2 shows conceptual diagrams showing the pixels in an original image and the pixels resulting from the processing at step 101. In FIG. 2, reference numeral 201 indicates the original monochrome image in which the pixels have brightness values in a 256-level gray scale, ranging from 0 to 255. For simplicity, it is assumed that the image is 9 pixels wide×7 pixels high. Also, the brightness value of each pixel is represented by A(x, y).

A procedure of low-pass filtering at step 101 will be described first, in which the low-pass filtering is applied only to the pixels located in the borders of the original image 201.

Here, low-pass filtering will be applied only to the pixels represented as shaded portions. First, low-pass filtering is horizontally applied to A(1, 0)-A(7, 0). The horizontal low-pass filtering basically computes the average of the brightness values of 5 pixels in the original image, centered on a pixel A(x, y) of interest and sets the average value as a new brightness value B(x, y) of the pixel of interest. For example, if A(4, 0) is the pixel of interest, the value $$(A(2, 0)+A(3, 0)+A(4, 0)+A(5, 0)+A(6, 0))/5$$

is computed and the result is set as the new brightness value B(4, 0). When A(1, 0) is the pixel of interest, the second pixel from the pixel A(1, 0) on the left does not exist, therefore the nonexistent pixel is not included in the low-pass filter, therefore the value $$(A(0, 0)+A(1, 0)+A(2, 0)+A(3, 0))/4$$

is set as the new brightness value B (1, 0). Similarly, when A(7, 0) is the pixel of interest, then the value $$(A(5, 0)+A(6, 0)+A(7, 0)+A(8, 0))/4$$

is set as the new brightness value B(7, 0). Horizontal low-pass filtering is applied to A(1, 6) to A(7, 6) in exactly the same way.

For A(1, 0) to A(0, 5), low-pass filtering is performed vertically. The vertical low-pass filtering computes the average of the original brightness values of 5 pixels in the original image, centered on a pixel A(x, y) of interest and sets the average value as a new brightness value B(x, y) of the pixel of interest. For example, if A(0, 2) is the pixel of interest, then the value $$(A(0, 0)+A(0, 1)+A(0, 2)+A(0, 3)+A(0, 4))/5$$

is computed and is set as the new brightness value B(0, 2). When A(0, 1) is the pixel of interest, the second pixel above the pixel of interest A(0, 1) does not exit, therefore the nonexistent pixel is not included in the low-pass filter and the value $$(A(0, 0)+A(0, 1)+A(0, 2)+A(0, 3))/4$$

is set as the new brightness value B(0, 1). Vertical low-pass filtering is also applied to A(8, 1-A(8, 5) in exactly the same way.

When A(0, 0), A(8, 0), A(0, 6), and A(8, 6) are the pixel of interest, low-pass filtering is applied both in the vertical and horizontal directions because they are located in a corner. Accordingly, when A(0, 0) is the pixel of interest, the value $$(A(0, 0)+A(1, 0)+A(2, 0)+A(0, 1)+A(0, 2))/5$$

is computed and set as the new brightness value B(0, 0). When A(8,0) is the pixel of interest, then the value $$(A(6, 0)+A(7, 0)+A(8, 0)+A(8, 1)+A(8, 2))/5$$

is computed and set as the new brightness value B(8, 0). Similar operations are performed on A(0, 6) and A(8, 6).

On the completion of the process described above, an image 202 resulting from the low-pass filtering that has been applied only to the pixels located in the borders is resulted.

In the foregoing description, the low-pass filter used calculates the average of the brightness values of 5 pixels centered on a pixel of interest. However, a low-pass filter that computes the average of a larger number of pixels may be used or a low-pass filter that computes a weighted average that is dependent on locations may be used to obtain a similar effect.

The detail of step 102 will be described below with reference to FIG. 3.

Figure 3:
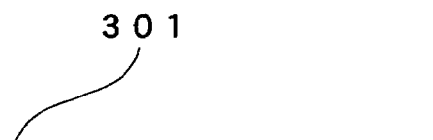
FIG. 3 is a diagram showing an arrangement of pixels in an intermediate image in the first embodiment.

FIG. 3 is a conceptual diagram showing the pixels in an image on which the processing at step 102 is applied. The image 301 is generated by the operation at step 102, in which the white portion is generated by the processing at step 101 (which is the image 202 in which only the pixels in the borders were lowpass-filtered) and the shaded portion represents the pixels newly generated by the processing at step 102.

That is, the size of the white portion is the same as that of the original image and the shaded portion is an extended portion. In the white portion, the locations represented by A(x, y) have the same brightness value as that in the original image and the locations represented by B(x, y) have the new brightness values resulting from the processing at step 101. The width of the extended portion depends on the area required by a low-pass filter used at step 103.

Here, the low-pass filter used at step 103 computes the average over a 5×5 pixel area centered on a pixel of interest and sets the average value as the new brightness value of the pixel of interest. In order to obtain the result of processing at the location B(0, 0), for example, with high accuracy, the brightness values of two pixels located above the location and two pixels on the left of the location are required. Therefore, 2-pixel-wide extended region is provided around the original image in the first embodiment. The brightness values in the extended region are obtained by extrapolation.

How to compute the brightness values in the upper and lower extended regions will be detailed first.

For example, the brightness value of C(0, −1) is computed by "2*B(0, 0)−B(0, 1)" and the brightness value of C(8, −1) is computed by "2*B(8, 0)−B(8, 1)". The brightness value of C(1, −1) is computed by "2*B(1, 0)−A(1, 1)". The brightness values of C(2, −1) to C(7, −1) can be computed in a similar way. The brightness value of C(0, −2) is computed by "2*B(0, 0)−B(0, 2)" and that of C(8, −2) is computed by "2*B(8, 0)−B(8, 2)". Also, the brightness value of C(1, −2) is computed by "2*B(1, 0)−A(1, 2)". The brightness values of C(2, −2) to C(7, −2) can be computed in a similar way.

The brightness value of C(0, 7) is computed by "2*B(0, 6)−B(0, 5) and that of C(8, 7) is computed by "2*B(8, 6)−B(8, 5). The brightness value of C(1, 7) is computed by "2*B(1, 6)−A(1, 5)". The brightness value of C(1, 7) to C(7, 7) can be computed in a similar way. The brightness value of C(0, 8) is computed by "2*B(0, 6)−B(0, 4)" and that of C(8, 8) is computed by "2*B(8, 6)−B(8, 4)". The brightness value of C(1, 8) is computed by "2*B(1, 6)−A(1, 4)". The brightness values of C(2, 8) to C(7, 8) can be computed in a similar way.

How to compute the brightness values in the left and right extended regions will be detailed next.

For example, the brightness value of C(−1, 0) is computed by "2*B(0, 0)−B(1, 0)" and that of C(−1, 6) is computed by "2*B(0, 6)−B(1, 6)". The brightness value of C(−1, 1) is computed by "2*(0, 1)−A(1, 1)". The brightness values of C(−1, 2) to C(−1, 5) can be computed in a similar way.

Because the brightness values in the upper and lower extended regions of the original image have already been computed, the brightness values of C(−1, −2) can be computed by using the values of C(0, −2) and C(1, −2) in a similar way. Also, the brightness values of C(−1, −1), C(−1, 7) and C(−1, 8) can be computed in a similar way. Then, the brightness value of C(−2, 0) is computed by "2*B(0, 0)−B(2, 0)" and that of C(−2, 6) is computed by "2*B(0, 6)−B(2, 6). The brightness value of C(−2, 1) is computed by "2*B(0, 1)−A(1, 2)". The brightness values of C(−2, 2) to C(−2, 5) can be computed in a similar way.

Because the brightness values in the upper and lower extended regions of the original image have already been computed, the brightness value of C(−2, −2) can be computed by using the values of C(0, −2) and C(2, −2) in a similar way. Also, the brightness values of C(−2, −1), C(−2, 7) and C(−2, 8) can be computed in a similar way.

Furthermore, the brightness value of C(9, 0) is computed by "2*B(8, 0)−B(7, 0)" and that of C(9, 6) is computed by "2*B(8, 6)−B(7, 6)". The brightness value of C(9, 1) is computed by "2*B(8, 1)−A(7, 1)". The brightness values of C(9, 2) to C(9, 5) can be computed in a similar way. Because the brightness values in the upper and lower extended regions of the original image have already been computed, the brightness value of C(9, −2) can be computed by using the values of C(8, −2) and C(7, −2) in a similar manner. Also, the brightness values of C(9, −1), C(9, 7) and C(9, 8) can be computed in a similar way.

Then, the brightness value of C(10, 0) is computed by "2*B(8, 0)−B(6, 0)" and that of C(10, 6) is computed by "2*B(8, 6)−B(6, 6)". The brightness value of C(10, 1) is computed by "2*B(8, 1)−A(6, 1)". The brightness values of C(10, 2) to C(10, 5) can be computed in a similar way. Because the brightness values in the upper and lower extended regions of the original image have already been computed, the brightness value of C(10, −2) can be computed by using the values of C(8, −2) and C(6, −2) in a similar way. Also, the brightness values of C(10, −1), C(10, 7), and C(10, 8) can be computed in a similar way. Thus, the brightness values of all pixels in the image 301 have been computed.

Finally, processing at step 103 will be described.

Because a processed image of only the region of the original image is required ultimately, computations are performed only on the white region in FIG. 3. As stated earlier, low-pass filtering performed at step 103 involves averaging a 5×5 pixel area centered on a pixel of interest and the average value is set as a new brightness value of the pixel of interest. The brightness value at the pixel location B(0, 0) after the processing is the average of the 5×5 pixel area centered on that location, therefore the brightness value can be obtained as $$(C(-2, -2) + C(-1, -2) + C(0, -2) + C(1, -2) + C(2, -2) + C(-2, -1) +$$
$$C(-1, -1) + C(0, -1) + C(1, -1) + C(2, -1) + C(-2, 0) + C(-1, 0) +$$
$$B(0, 0) + B(1, 0) + B(2, 0) + C(-2, 1) + C(-1, 1) + B(0, 1) + B(1, 1) +$$
$$B(2, 1) + C(-2, 2) + C(-1, 2) + B(0, 2) + B(1, 2) + B(2, 2))/25.$$

A similar operation is performed on the entire white portion in FIG. 3 to obtain the desired processed image. While the exemplary low-pass filter described above computes the average over a 5×5 pixel area, a low-pass filter of a different size or a low-pass filter using a different operation such as weighted averaging can be used to obtain a similar effect.

Because pixels have been generated around the original image by the processing at step 102, exceptional processing designed to processing the borders is not required in the processing at step 103. Instead, the same processing can be applied to both central and border portions. The effect will be described with reference to FIGS. 4A and 4B.

The assumption in the following description is that the brightness in an original image increases from left to right. For simplicity, it is assumed that the brightness of the image in the vertical direction is uniform, and only one-dimensional processing in the horizontal direction will be described.

Figure 4A:
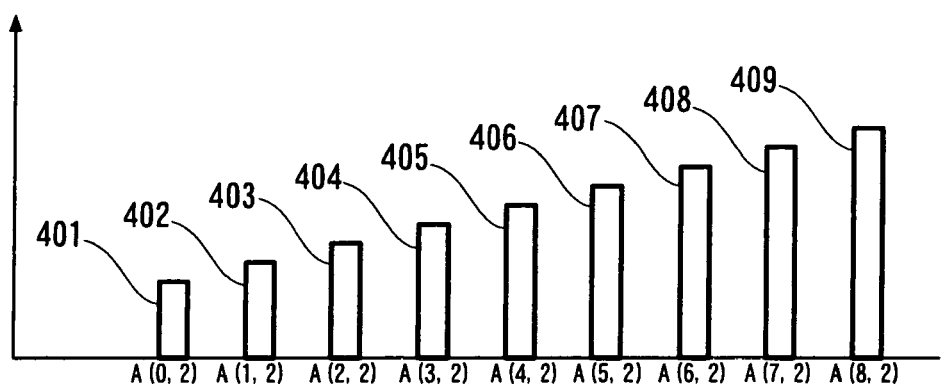
FIG. 4A is a graph in which the heights represent brightness values of the pixels in the third row from the top of the original image shown in FIG. 2.

FIG. 4A shows the brightness values, represented by height, of the pixels in the third row from the top of the original image shown in FIG. 2. The heights of bars 401 to 409 represent the brightness values of A(0, 2) to A(8, 2), respectively. As can be seen from FIG. 4A, the brightness increases from left to right. Conventional low-pass filters, which provide the average of 5 pixels centered on a pixel of interest as the result of their processing, compute the average of the brightness values 407-409 of 3 pixels for the location A(8, 2) because no pixel exists to the right of that location. As can be seen from FIG. 4A, the result is substantial equal to the height of the brightness value 408, which is lower than the actual, original brightness value 409.

Figure 4B:
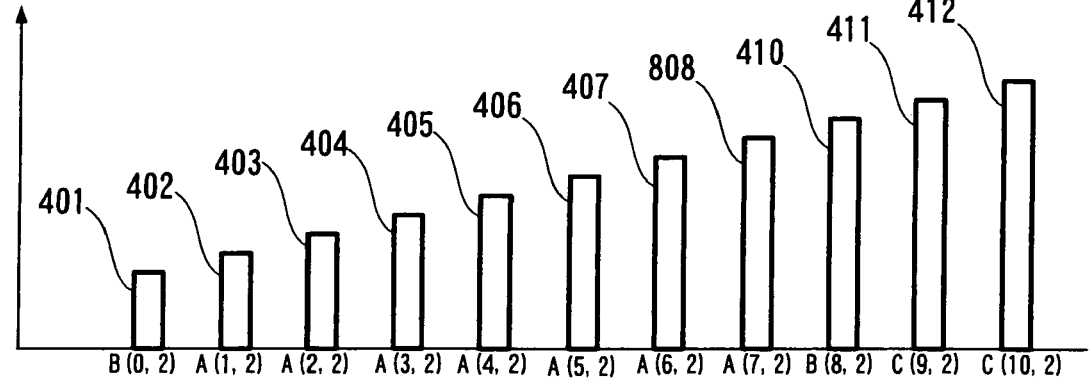
FIG. 4B is a graph in which the heights represent brightness values of the pixels in the fifth row from the top of the image shown in FIG. 3.

FIG. 4B shows the brightness values in an example in which image processing according to the present invention is applied to the original image.

FIG. 4B shows the brightness values of the pixels, represented by height, in the fifth row from the top of the image shown in FIG. 3. The heights of bars 401 to 408 represent the brightness values of A(0, 2)-A(7, 2), respectively, the height of a bar 410 represents the brightness value of B(8, 2) and the heights of bars 411 and 412 represent the brightness values of C(9, 2) and C(10, 2), respectively.

Brightness value 410, generated by a vertical low-pass filter at step 101, is equal to the brightness value 409 because the assumption is made that there are the equal brightness values in the vertical direction in the original image. The percentage of increase between the brightness values 411 and 412, generated by extrapolation at step 102, is the same as that of increase in the brightness values 407 through 410. Processing at step 103 at the location B(8, 2) is averaging of the brightness values 407-412 of 5 pixels. As can be seen from FIG. 4B, the result is substantially equal to the height of brightness value 410. This shows that the values close to the average value of the original image can be obtained even in the borders of the image according to the present invention.

The brightness values of pixels in the extended regions are obtained by extrapolation at step 102. In the extrapolation, if B(2, 0) for example has an error due to noise, the value of C(2, −1) contains an error twice as large as that error, as can be seen from the equation $$C(2, -1) = 2*B(2, 0) - A(2, 1)$$

Similarly, if C(2, −2) has also an error and the brightness at the location B(2, 0) is computed in the processing at step 103, the errors will have a significant effect on the result of the processing because both C(2, −1) and C(2, −2) are used. This shows that, according to the present invention, errors in the brightness values in the borders of an original image due to noise significantly affect the final processing outcome. This is avoided by the processing at step 101, in which low-pass filtering is applied to the pixels in the borders of an original image to prevent noise.

Thus, a low-pass filter capable of preserving the average brightness of an original image can be implemented.

As has been described, according to the first embodiment, extended regions are provided around an image before low-pass filtering, thereby enabling the low-pass filtering to be performed in the border portions of the image under the same conditions as in the central portions of the image, producing an optimum low-pass filtering outcome in which the average brightness even for the pixels in the borders are guaranteed.

Second Embodiment

FIG. 5 shows an image processing apparatus performing image processing based on the image processing method described in the first embodiment. FIG. 9 shows a specific processing method performed by a defect detecting apparatus 502.

The image processing apparatus can be used for inspecting an image capturing device, such as a digital still camera or digital video camera, that uses a lens and a CCD (charge-coupled device). The following is a description of an exemplary application of the image processing apparatus as an inspection apparatus for inspecting lenses and CCDs in a digital still camera to be inspected for defects.

A camera 500 shown in FIG. 5, which is a digital still camera to be inspected, is used to capture an image of an inspection flat panel 501. The flat panel 501 is a solid-pail-color plate, painted gray for example. An original image P0 is an image of the flat plane 501 captured by the camera 500, and is digital image data. The original image P0 in the present embodiment has a brightness of 256 gray levels per pixel of the CCD of the camera 500 and a size of 1024×768 pixels. A method for detecting a defect in a lens or CCD of the camera by using the original image P0 on a defect inspection apparatus 502 will be described below.

Reference numeral 503 denotes an image processing unit which implements an image processing method of the first embodiment described above. The image processing unit 503 averages pixels in a 100×100 area. The size of this area covered by the image processing unit 503 is large enough for performing averaging according to the present invention since the number of pixels in a largest possible defect is on the order of 50×50. If averaging is performed over a 100×100 neighborhood of each of the pixels in a maximum 50×50 defect portion, the defect portion is equal to ¼ of the area at the maximum and at least ¾ of the area has a background brightness value. Accordingly, the brightness value of the pixels after the averaging is much closer to the background brightness than that of the defect portion. As a result, the effect of the defect portion is practically eliminated, and the image processing unit 503 outputs a first processed image P1 which is very close to the brightness distribution of the original image P0.

Reference numeral 504 denotes a subtracter which computes the differences between an original image P0 and a first processed image P1 outputted from the image processing unit 503. The subtracter 504 outputs a second processed image P2 in which only defect portions, which are the differences between the two images, have non-zero values.

The output from the subtracter 504 is then inputted into a binarizing circuit 505. The binarizing circuit 505 evaluates the output from the subtracter 504 on a per pixel basis and outputs "1" if the absolute value of the brightness of a pixel of interest is greater than a predetermined threshold, or outputs "0" if it is less than or equal to the threshold. The threshold is set to "1" in this example in order to enable subtle defects to be detected. However, if a defect is clear, a greater threshold may be set. The binarizing circuit 505 outputs "1" for a pixel at which the original image P0 disagrees with the original brightness distribution that the original image P0 originally has. As a result, a resultant image P3 can be obtained in which only defect pixels are represented as "1".

The resultant image P3 contains all pixels of defect portions. However, an acceptable-quality standard for some products to be inspected may accept products as non-defective, depending on the level of defects. Accordingly, the resultant image P3 should not directly be used to make determination as to whether products are defective or not. Therefore, an evaluation value computing circuit 506 and a determining circuit 507 evaluate the resultant image P3 and check the evaluation against an allowable-quality standard inputted through a shipping quality range input device 508 to determine whether the quality of the camera 500 under inspection is acceptable or not.

For example, if a quality standard is inputted beforehand through the shipping quality range input device 508 that rejects a products providing an image containing 50 or more defect pixels in total as a defective one, the determining circuit 507 obtains the total number of the pixels having the value "1" in the resultant image P3. If it is less than 50, the determining circuit 507 determines that the product is acceptable. If it is greater than or equal to 50, then the determining circuit 507 determines that the product is defective. The determining circuit 507 outputs the result to a result display device 509. If a standard is inputted beforehand through the shipping quality range input device 508 that rejects a product providing an image in which the number of the largest set of contiguous defective pixels is 30 or more, the determining circuits 507 searches for sets of continuous pixels having the value "1" in the resultant image P3 and obtains the number of pixels in the largest set found. If the number is less than 30, then the determining circuit 507 determines that the product is acceptable. Otherwise, it determines that the product is defective. The determining circuit 507 outputs the result to the result display device 509. The result display device 509 displays the result of determination from the determining circuit 507 to indicate to a human operator whether the product is acceptable or not.

The output from the subtracter 504 is directly used as the second processed image P2 in the example described above. However, in practice, noise components contained in an original image P0 will have non-zero values. In order to remove these, a median filter may be applied to the output from the subtracter 504 and the filtered image may be used as the second processed image P2. Median filters, which are commonly used in image processing, sort the brightness values of pixels in a neighborhood of a pixel of interest in descending order of magnitude and set the middle value in the series as the brightness value of the pixel of interest. The median filter can remove noise portions while preserving only brightness varying portions having a certain size or larger.

Conventional image processing apparatuses do not guarantee the average brightness value in borders. Accordingly, if a conventional image processing method is used in the image processing unit 503, it may fail to properly detect defects in a border. In contrast, the present method can correctly extract defects because the average value of the borders of the low-pass filter is close to that in the original image.

As has been described, according to the present embodiment, subtraction is performed between an original image P0 and a first processed image, which is obtained by using the image processing method of the first embodiment and represents the original brightness distribution of the original image P0, and the differences are binarized. Thus, defects can be correctly extracted.

An exemplary processing method in which the defect detecting apparatus 502 given above is implemented by software will be described below in detail with reference to FIG. 9.

FIG. 9 is a flowchart showing an embodiment of a method for detecting defects in a lens or CCD during an inspection of a device such as a digital still camera.

At step 901, low-pass filtering described in the first embodiment is applied to an original image P0 captured by a camera. Here, pixels in a 100×100 area will be averaged, which is large enough as compared to a largest possible defect area (50×50). Accordingly, the effects of defect portions are practically removed on the same principles that have been described with respect to the image processing unit 503. The result is a first processed image P1 which is very close to the brightness distribution of the original image P0.

At step 902, the differences between the first processed image P1 and the original image P0 are obtained. Ideally, only defect portions, which are the differences between the two images, will have non-zero values as a result of this operation. However, in practice, noise components contained in the original image P0 also will have non-zero values. Therefore, at step 903, median filtering is applied to the result of the operation at step 902.

Median filters, which are commonly used in image processing, sort the brightness values of pixels in a neighborhood of a pixel of interest in descending order of magnitude and set the middle value in the series as the brightness value of the pixel of interest. The median filter can remove noise portions while preserving brightness varying portions having a certain size or larger. Accordingly, the processing at step 903 provides a result P2 in which only defect portions have non-zero values.

At step 904, the result P2 is binarized. In the binarization, the result P2 is evaluated on a pixel-by-pixel basis and, if the absolute value of the brightness of a pixel of interest is greater than a predetermined threshold, "1" is outputted for the pixel, or if the absolute value is smaller or equal to the threshold, "0" is outputted for the pixel. The threshold is set to "1" in this example in order to enable subtle defects to be detected. It may be set to a greater value if defects are clear. As a result of the binarization, "1" is outputted for a pixel at which the brightness of the original image P0 disagrees with the original brightness distribution that the original image P0 originally has. Consequently, a resultant image P3 can be obtained in which only defect pixels are represented as "1".

At step 905, the total number of defective pixels contained in the resultant image P3 is counted. This can be accomplished by counting the pixels that have the value "1" in the entire resultant image P3.

At step 906, the count value obtained at step 905 is compared with an acceptable number of defective pixels, for example 50 based on a given quality standard that "products that provide 50 or more defective pixels are defective ones". If the count value obtained at step 905 is greater than or equal to 50, information indicating that the item is defective is outputted at step 907. On the other hand, if the count value obtained at step 905 is less than 50, then information indicating that the item is acceptable is outputted at step 908.

Third Embodiment

Figure 6:
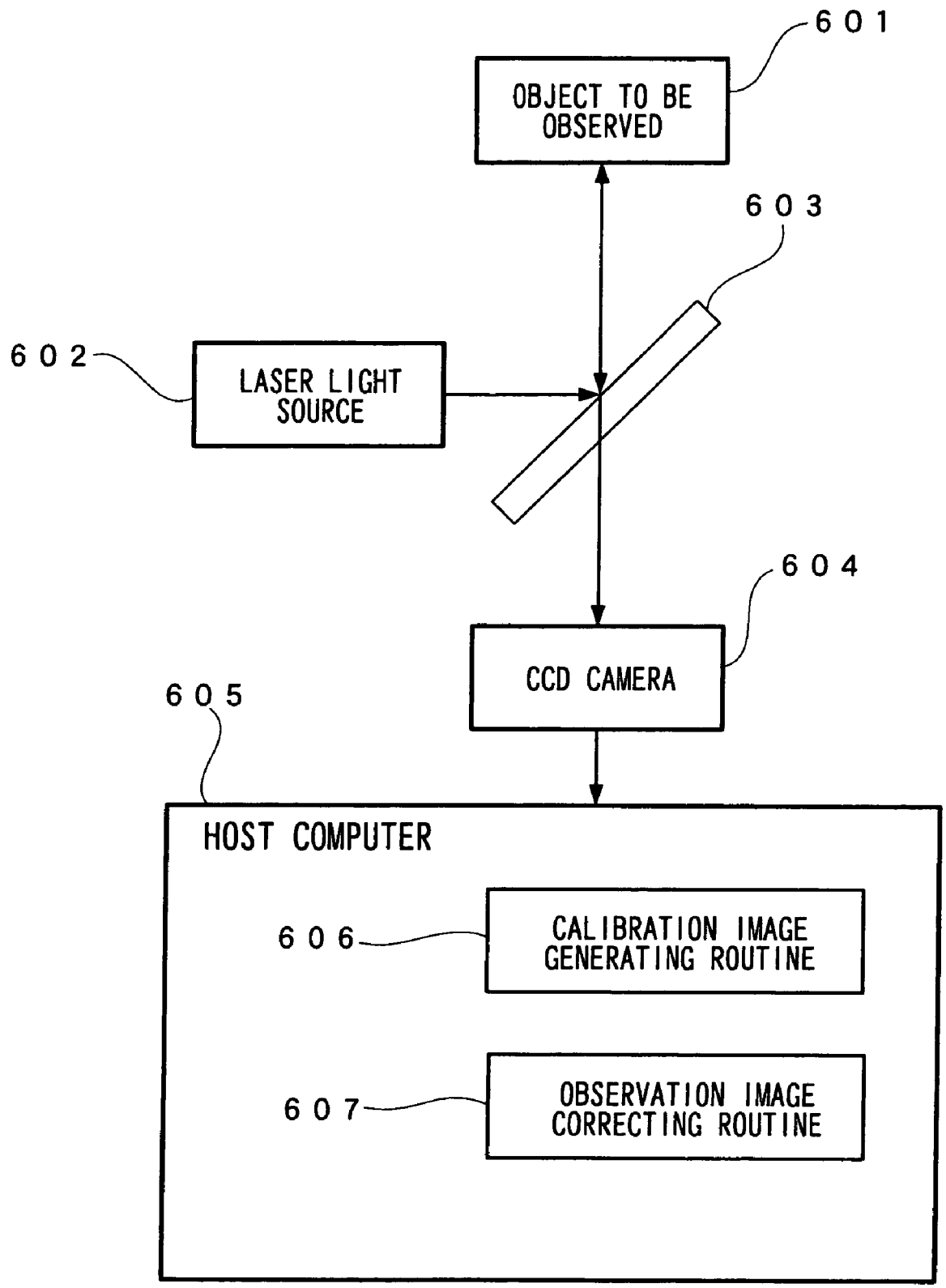
FIG. 6 is a block diagram of a fluorescent microscope imaging system according to a third embodiment of the present invention.
Figure 7:
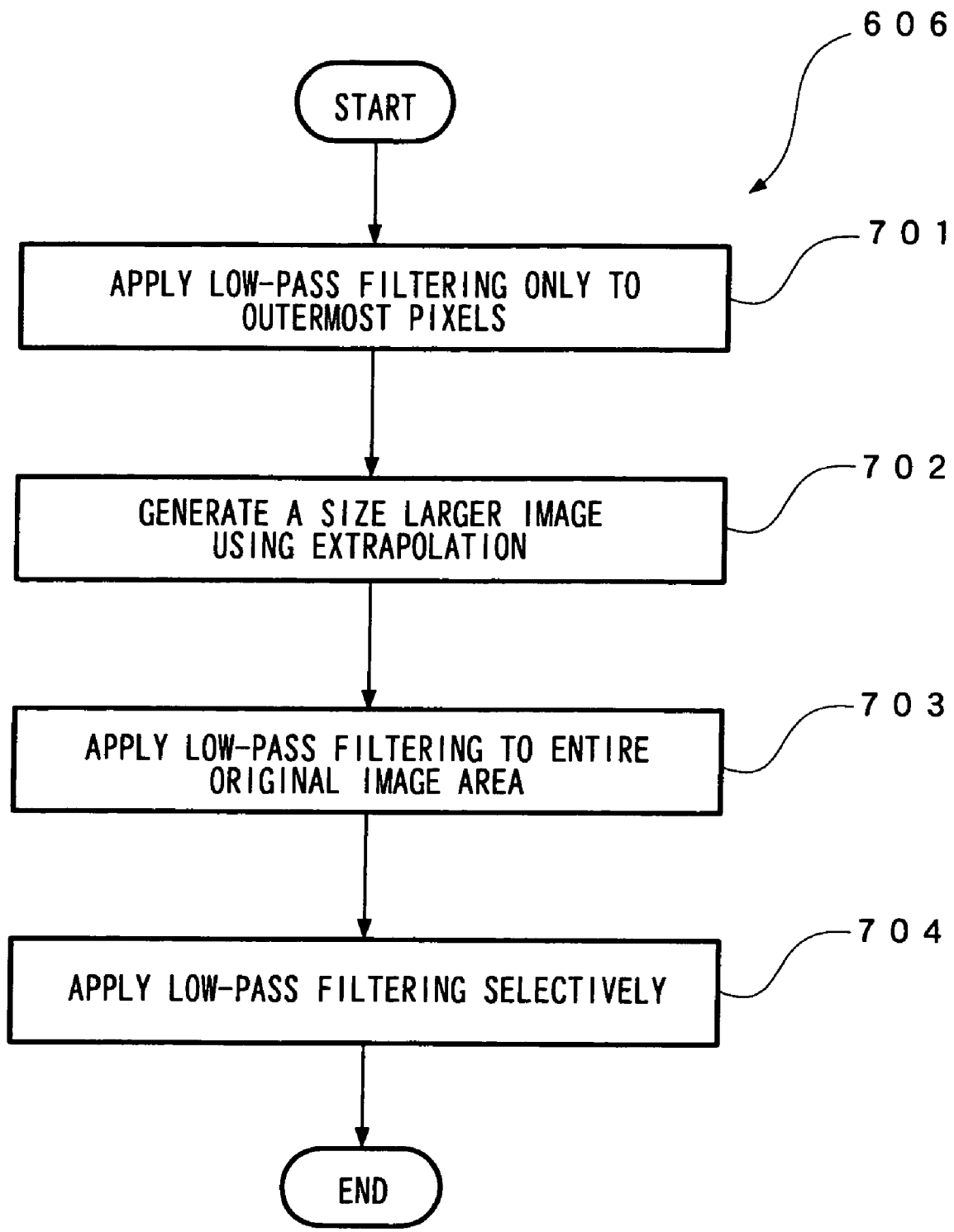
FIG. 7 is a flowchart of a process for generating a calibration image according to the third embodiment.
Figure 8:
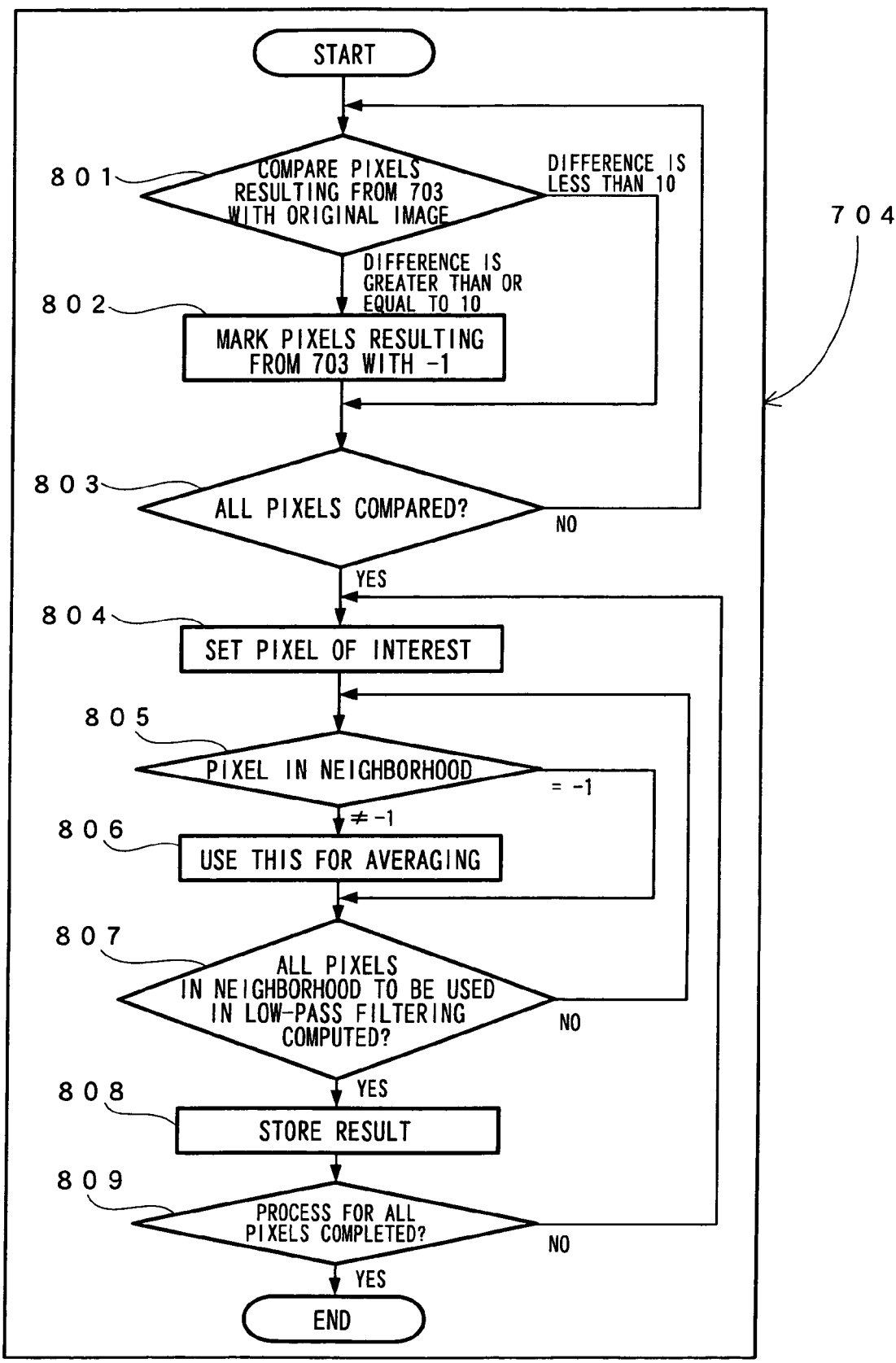
FIG. 8 is a flowchart of step 704 in the third embodiment.

FIGS. 6 to 8 show a fluorescent microscope image capturing apparatus performing image processing according to the image processing method of the first embodiment.

In FIG. 6, reference numeral 601 denotes an object to be observed, which is an image to be corrected and may be fluorescently dyed microbe cells, for example. When a laser beam from a laser light source 602 is reflected by a dichroic mirror and applied to the object to be observed 601, the fluorochrome in the object to be observed 601 is energized by the laser light to emit light with a particular wavelength. The light is captured by a CCD camera 604, digitized into image data, and processed in a host computer 605.

It is difficult to uniformly irradiate the observation surface with laser light emitted to the object to be observed 601. Typically, an illumination distribution is exhibited in which portions closer to the center are brighter than portions closer to the edges. If a fluorescent image energized by the laser light is displayed as is, the actual distribution of fluorochrome is not accurately displayed. Therefore, calibration of the illumination distribution of the laser light must be performed.

The calibration is performed by using a calibration image provided in addition to a captured image of the object to be observed 601, as follows.

The calibration image is acquired by capturing an image of a standard sample on which a fluorochrome is applied uniformly, instead of an object to be observed 601 of FIG. 6. Because the acquired calibration image represents the illumination distribution of the laser light, each pixel of the captured image of the object is divided by the corresponding pixel of the calibration image, thereby to obtain an image after calibration in which the effect of the illumination distribution of the laser light is canceled.

However, it is difficult to prepare an ideal standard sample used for acquiring a calibration image. In practice, small contaminations will often be contained. If a calibration image containing such contaminations were directly used for calibration, the contaminations would appear as shades in a displayed image.

Therefore, in the third embodiment the host computer 605 performs image processing described below.

The host computer 605 includes a calibration image generating routine 606 and an observation image correcting routine 607. The calibration image generating routine 606, which generate an ideal calibration image from a captured image of a standard sample, is configured as shown in FIG. 7.

At step 701, low-pass filtering is applied only to the pixels in the borders of a captured image of a standard sample.

At step 702, a larger image is generated by extrapolation.

At step 703, low-pass filtering is applied to the region of the original image in the generated larger image.

The process so far is the same as in the first embodiment.

Finally, at step 704, the image generated at step 703 is compared with the original image on a pixel-by-pixel basis and further low-pass filtering is applied to the image generated at step 702 without using pixels having differences greater than or equal to a predetermined threshold.

FIG. 8 details the operation at step 704.

At step 801, the result of step 703 is compared with the brightness of the original image on a pixel-by-pixel basis. If the difference in brightness is greater than or equal to "10", the pixel in the image resulting from step 703 is marked with −1 at step 802, indicating that the pixel has a significant error. If there is a significant error, the pixel is likely to correspond to a contamination. Therefore, the meaning of the marking is to mark a contamination.

While the threshold is set to "10" or greater in this example, the threshold may be set to any other value.

The process is performed for every pixel in the original image. If there remains an unprocessed pixel at step 803, steps 801 to 802 are repeated. Once all pixels having large differences have been marked, the process proceeds to step 804 in order to apply further low-pass filtering.

A pixel is set as the pixel of interest, which is specified in order, at step 804, and the values of pixels in a neighborhood of the pixel of interest which are used in low-pass filtering are checked at step 805.

If the value of a pixel is −1, the pixel is ignored. If not −1, the value of the pixel is used in averaging at step 806. For example, if there are 25 pixels to be used in a low-pass filter and 2 pixels among them have the value −1, the average value of the remaining 23 pixels are computed and set as a new brightness value of the pixel of interest. At step 807, determination is made as to whether all pixels in the neighborhood of the current pixel of interest that are to be used in the low-pass filter have been processed. If there remains an unprocessed pixel, steps 805 and 806 are repeated. If it is determined at step 807 that all pixels have been processed, the result of low-pass filtering for the one single pixel is stored at step 808.

At step 809, determination is made as to whether or not the process given above has been completed for all pixels. If not, steps 804 to 808 are repeated until all pixels are processed, then the process will end.

With this process, an optimum calibration image that has not been affected by contaminations can be generated by low-pass filtering without using pixels that have values departing from the average brightness due to contamination. The generated calibration image is stored in the host computer 605.

After the calibration image has been obtained by executing the calibration image generating routine 606 on the host computer 605, the operator replaces the standard sample under observation with an ultimate object to be observed 601, such as microbe cells dyed with a fluorochrome, and instructs the computer 605 to execute the observation image correcting routine 607. Then, the observation image correcting routine 607 performs calibration, in which the optimum calibration image, not affected by contaminations because pixels having brightness values departing from the average brightness due to contaminations have been excluded from the low-pass filtering, is used to perform division on a corresponding pixel-by-pixel basis to accurately cancel the effect of illumination distribution of laser light. Thus, the original distribution of the fluorochrome can be accurately displayed.

Low-pass filtering has been applied only to the pixels in the borders of the original image P0 in the early stage of the process in the embodiments described above. However, the low-pass filtering may be applied only to pixels near the borders of the original image P0 and the pixels that are nearer to the edges than those pixels may be discarded, and then the subsequent image processing may be performed.

Furthermore, while the low-pass filtering has been applied only to the pixels in the borders or pixels near the borders of the original image P0 in the early stage of the process in the embodiments, described above, the low-pass filtering may also be applied to the remaining portions of the original image P0 at the same time. The intended purpose can be accomplished by applying low-pass filtering to at least pixels in the borders or pixels near the borders of the original image.

It should be noted that "applying low-pass filtering by using pixels located in the direction perpendicular to the direction of extrapolation" herein has the following meaning: If the pixels C(2, −1) and C(2, −2) are to be vertically extrapolated for the pixels B(2, 0) and A(2, 0), the pixel B(2, 0) is the origin and the pixels B(1, 0) and B(3, 0) located in the horizontal direction are the pixels located in the direction perpendicular to the vertical extrapolation. If the pixels C(−1, 2) and C(−2, 2) are to be horizontally extrapolated for pixels B(0, 2) and A(1, 2), the pixel B(0, 2) is the origin and the pixels B(0, 3) and B(0, 1) in the vertical direction are the pixels located perpendicular to the horizontal extrapolation.

The image processing method according to the present invention provides an accurate result that guarantees the average brightness in borders, and therefore an accurate low-pass filter can be implemented. For example, using an image processing apparatus incorporating this image processing method to inspect a digital camera is useful, because a good inspection method that is free of erroneous detection can be implemented.

Furthermore, the image processing method according to the present invention is useful because if this method is used for calibration of a fluorescent microscope, for example, an accurate calibration can be implemented and an accurate display can be achieved.

What is claimed is:

1. An image processing method of treating an image as two-dimensional data of pixels having multiple gray levels, the method comprising:
    applying low-pass filtering to pixels in borders of an original image;
    extending the region of the original image and obtaining the brightness of the extended portion by extrapolation using as an origin a pixel included in the region to which the low-pass filtering has been applied; and
    applying low-pass filtering to the region of the original image by using the brightness of the extended portion.

2. The image processing method according to claim 1, wherein applying low-pass filtering to the pixels in the borders of an original image comprises applying one-dimensional low-pass filtering to the pixels in the borders of the original image.

3. The image processing method according to claim 1, wherein applying low-pass filtering to the pixels in the borders of an original image comprises applying low-pass filtering by using pixels located in the direction perpendicular to the direction of extrapolation.

4. The image processing method according to claim 1, wherein the extent to which the region of the original image is extended is determined depending on the extent of low-pass filtering to be applied to the region of the original image by using the brightness of the extended portion.

5. The image processing method according to claim 4, wherein if the size of a neighborhood pixel region required for computation in low-pass filtering applied to the region of the original image including the extended portion is A pixels high x B pixels wide, then the region of the original image is extended by A pixels in the vertical direction and by B pixels in the horizontal direction.

6. The image processing method according to claim 1, further comprising obtaining differences between a first processed image obtained by performing the image processing method according to claim 1 and an original image to obtain a second processed image.

7. The image processing method according to claim 6, wherein the second processed image is binarized to detect a defective portion contained in the original image.

* * * * *